(12) United States Patent
Fontana et al.

(10) Patent No.: US 10,075,624 B2
(45) Date of Patent: Sep. 11, 2018

(54) WEARABLE PORTABLE CAMERA

(71) Applicant: BOSE CORPORATION, Framingham, MA (US)

(72) Inventors: Gustavo Fontana, Framingham, MA (US); Mark A. Zeh, Munich (DE); Brian David Mulcahey, Sudbury, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/140,957

(22) Filed: Apr. 28, 2016

(65) Prior Publication Data

US 2017/0318199 A1 Nov. 2, 2017

(51) Int. Cl.
*H04N 5/225* (2006.01)

(52) U.S. Cl.
CPC ................................ *H04N 5/2251* (2013.01)

(58) Field of Classification Search
CPC .................................................. H04N 5/2251
See application file for complete search history.

(56) References Cited

U.S. PATENT DOCUMENTS

| 5,384,609 A * | 1/1995 | Ogawa | F16M 11/28 396/419 |
| 2001/0051049 A1* | 12/2001 | Horiguchi | H04N 5/2252 348/E5.026 |
| 2002/0071595 A1 | 6/2002 | Pirim | |
| 2002/0109579 A1 | 8/2002 | Pollard et al. | |
| 2002/0176004 A1* | 11/2002 | Shinada | H04N 5/2252 348/207.99 |
| 2010/0245585 A1* | 9/2010 | Fisher | H04N 5/23212 348/164 |
| 2014/0294257 A1 | 10/2014 | Tussy | |
| 2014/0295915 A1* | 10/2014 | Zhong | H04M 1/0272 455/556.1 |
| 2015/0172830 A1 | 6/2015 | Liu et al. | |
| 2015/0237455 A1 | 8/2015 | Mitra et al. | |
| 2015/0281832 A1 | 10/2015 | Kishimoto et al. | |
| 2015/0304532 A1* | 10/2015 | Bart | H04N 5/2252 348/373 |
| 2015/0341734 A1 | 11/2015 | Sherman | |
| 2016/0187763 A1* | 6/2016 | Fromm | G03B 17/561 396/428 |

FOREIGN PATENT DOCUMENTS

JP 2012029209 A 2/2012

OTHER PUBLICATIONS

Boone, J., "Just When You Thought Google Glass Couldn't Get Creepier: New App Allows Strangers to ID You Just by Looking at You", E! Entertainment Television, LLC, Feb. 2014, retrieved from <http://www.eonline.com/news/507361/just-when-you-thought-google-glass-couldn-t-get-creepier-new-app-allows-strangers-to-id-you-just-by-looking-at-you>.

* cited by examiner

*Primary Examiner* — Gevell Selby
(74) *Attorney, Agent, or Firm* — Lando & Anastasi, LLP

(57) ABSTRACT

A portable camera is provided for, including a camera section, a body section, and an attachment portion, wherein the camera section and the body section are configured to contact one another along an angled surface that allows the camera section to swivel with respect to the body section. The attachment portion may also be connected to the body section via a magnet and may further include ports for attaching to a charging and/or data cable.

25 Claims, 15 Drawing Sheets

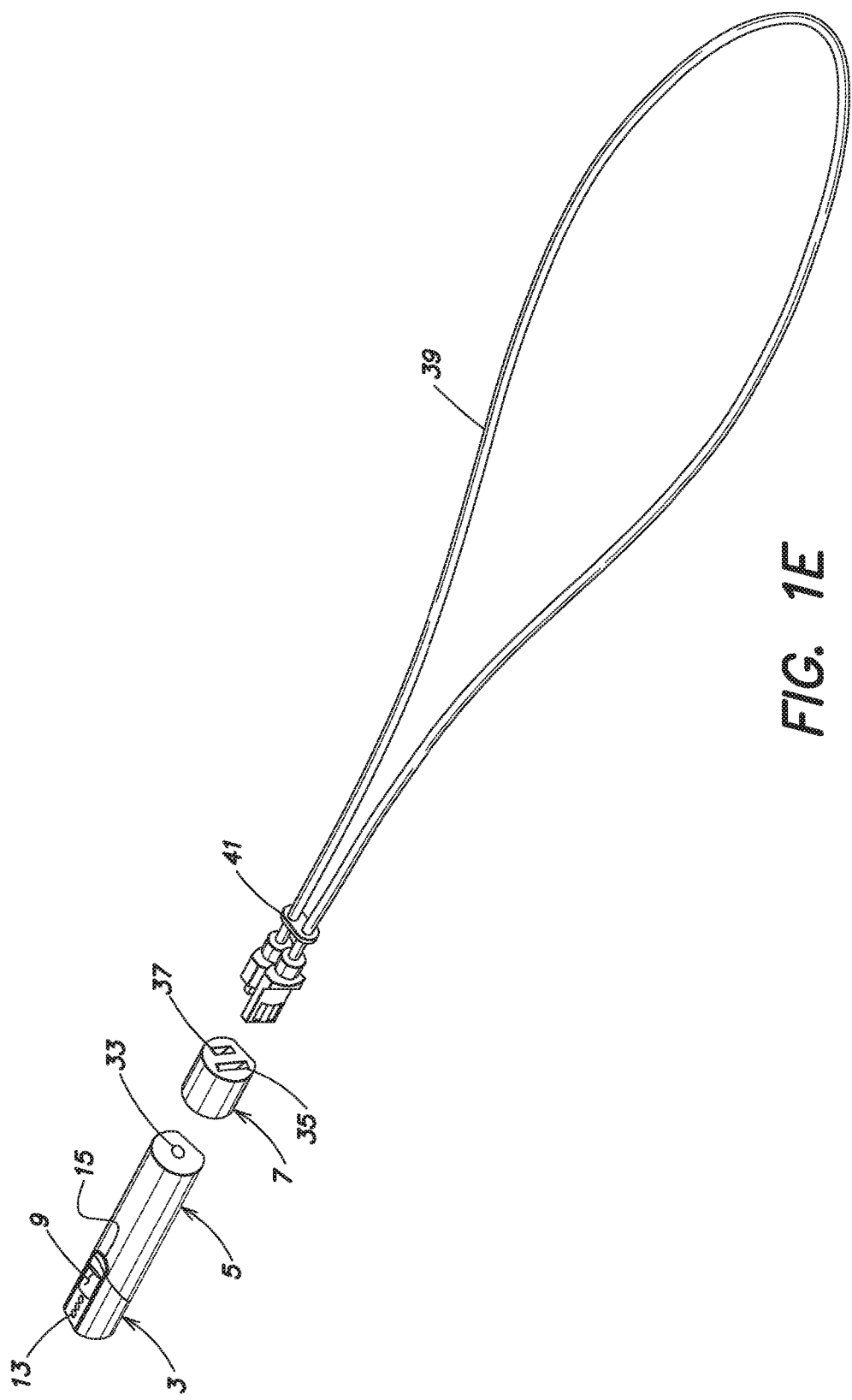

WEARABLE PORTABLE CAMERA

FIELD

This disclosure relates to a wearable, portable camera that may be worn by a user to record experiences and scenes in an unobtrusive and convenient manner.

BACKGROUND

Digital cameras, particularly digital cell phone cameras, have become ubiquitous in modern life. Public events and private scenes are routinely recorded with the use of a person's cell phone or other digital recording device with a view screen. However, such devices may be disruptive to the user because they create a viewing barrier between the user and the event being recorded.

Often times, important events and scenes may be viewed through a digital view screen on a camera or camera phone, despite the user's physical presence at the event. This behavior may diminish the personal experience of the user by technologically "separating" them from the live event. Thus, there exists a need for a portable camera that may be worn by a user to record experiences and scenes in an unobtrusive and convenient manner, such as a wearable camera, so that the user may experience live events and experiences in a more natural manner.

SUMMARY

This disclosure relates to systems, methods, and apparatuses for providing a portable camera.

All examples and features mentioned below can be combined in any technically possible way.

In some examples, a camera is provided which may include a camera section, comprising a housing, a video camera, and a lens. The camera may also include a body section, comprising a housing, wherein the camera section and the body section are configured to contact one another along a first angled surface of the camera section and a second angled surface of the body section. A joint for connecting the camera section to the body section may allow the camera section to rotate at the first and second angled surfaces. In some examples, the body section further comprises a battery. In other examples, the first and second angled surfaces comprise planar surfaces having an angle of between 35 and 55 degrees from horizontal when the camera is in a vertical position. The joint may also allow the camera section and the body section to rotate with respect to one another in order to form an angle with respect to one another between 90 and 180 degrees.

In some implementations the camera may also include a gyroscope or accelerometer and a processor configured to receive signals from the gyroscope or accelerometer indicating a vertical direction and being further configured to crop camera images based, at least in part, on the indicated vertical direction so as to provide a horizontally oriented image, despite any potential rotation of the camera section. In other implementations the camera may include an attachment portion removably attached to the body section or the camera section. In some examples, the attachment portion removably attaches to the body portion through the use of magnets. In other examples the attachment portion comprises at least one slot for receiving at least one end of a charging and/or data cable. The attachment portion may also comprise two slots for receiving two ends of a charging/data cable.

In some examples, the camera may further comprise an arrayed microphone. In such examples, the joint may comprise a sound-activated servo configured to direct the camera section towards sound detected by the arrayed microphone. In other examples, the camera may include at least one accelerometer or gyroscope and the joint may comprise a motorized servo configured to self-level the camera section in response to camera movements detected by at least one accelerometer or gyroscope.

In other examples, the camera may also comprise one or more pointers configured to project laser, LED, infrared, or polarized light. The one or more pointers may be configured and arranged to project at least a portion of a recording window that indicates at least a portion of the recording area of the camera. In some examples, the one or more pointers are disposed within the camera section and behind an optic zoom. In other examples, the camera may include an attachment feature for removably attaching the camera to a structure or surface. In some implementations, the attachment feature may comprise a clip, Velcro, magnets, an attachment strip, a lock, a bore, projection, or bayonet mount.

A configurable lanyard may also be provided, comprising a plurality of hollow spacers, a plurality of spherical joints, a tension cable disposed through the plurality of hollow spacers and the plurality of spherical joints, and a cam bar or bell crank for placing the tension cable under tension. In some examples, the tension cable is embedded at both ends within an end piece, which may be configured to couple with a camera. In other examples, a charging/data cable may be disposed within the plurality of hollow spacers and the plurality of spherical joints. A lever may also be attached to the cam bar or bell crank. The configurable lanyard may also comprise one or more projections from one or more hollow spacers or spherical joints for impeding the progress of the lever between a tensioned and untensioned position.

Headphones may also be provided, comprising two housings, each comprising a loudspeaker located inside the housings and cushions coupled to the housing, and a headband connecting the two housings. A camera may be removably attached to one or more of the housings or the headband. The camera may further comprise a camera section, comprising a housing, a video camera, and a lens, and a body section, comprising a housing. In such examples, the camera section and the body section may be configured to contact one another along a first angled surface of the camera section and a second angled surface of the body section. A joint for connecting the camera section to the body section may allow the camera section to rotate at the first and second angled surfaces.

BRIEF DESCRIPTION OF THE DRAWINGS

Various aspects of at least one implementation of a camera are discussed below with reference to the accompanying figures. The figures are provided for the purposes of illustration and explanation and are not intended as a definition of the limits of the disclosure.

FIG. 1E is a front, lower perspective view of a camera in one implementation of the present disclosure with an attachment portion detached and a power/data cable detached.

DETAILED DESCRIPTION

It should be understood that the following descriptions are not intended to limit the disclosure to an exemplary implementation. To the contrary, it is intended to cover alternatives, modifications, and equivalents as may be included within the spirit and scope of the described subject matter.

Figure 1A:
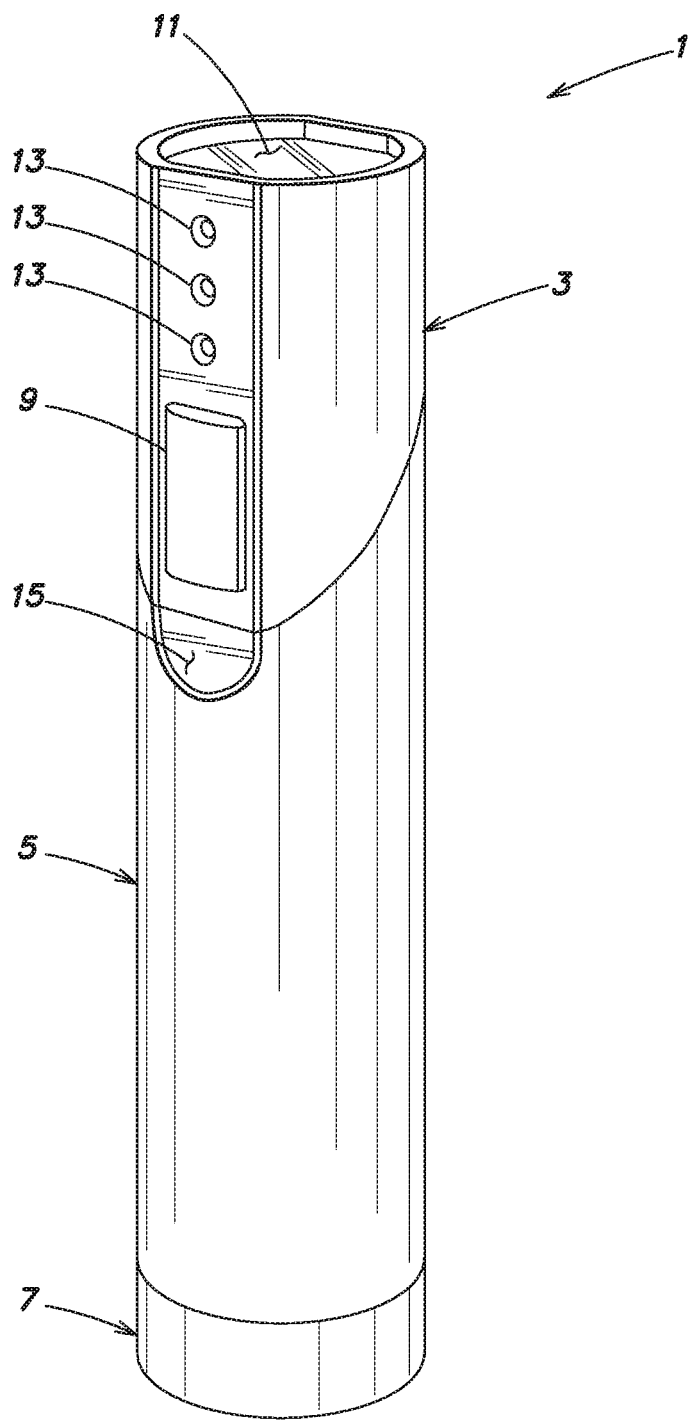
FIG. 1A is a front, top perspective view of a camera in one implementation of the present disclosure in a straight position.

FIG. 1A is a front, top perspective view of a camera 1 in one implementation of the present disclosure. As shown, in some implementations camera 1 may comprise an elongate camera including a camera section 3, a body section 5, and an attachment portion 7. In some examples, camera 1 may have a generally cylindrical shape, although other suitable shapes may be employed to meet the needs of a user. In some examples, camera 1 may have an effective diameter of approximately 2 cm, however, in other configurations, camera 1 may have an effective diameter of between 1 cm and 10 cm. In a generally cylindrical configuration, as shown, camera 1 may be held and utilized generally as a user would hold and direct a small flashlight. Camera 1 may also be disposed on a flat surface in an upright position as shown, for example, in FIGS. 1A-1C.

The various sections of camera 1 may comprise separate housings formed of any suitably rigid materials, such as metal, plastic, wood, composites, or any other suitable housing materials known to one of ordinary skill in the art. In some examples, camera section 3, body section 5, and/or attachment portion 7 may be configured to be movable or rotatable with respect to one another, as described herein. In other examples, camera 1 may not include distinct sections, but may instead comprise one integrally-formed camera housing for supporting a camera.

Figure 3A:
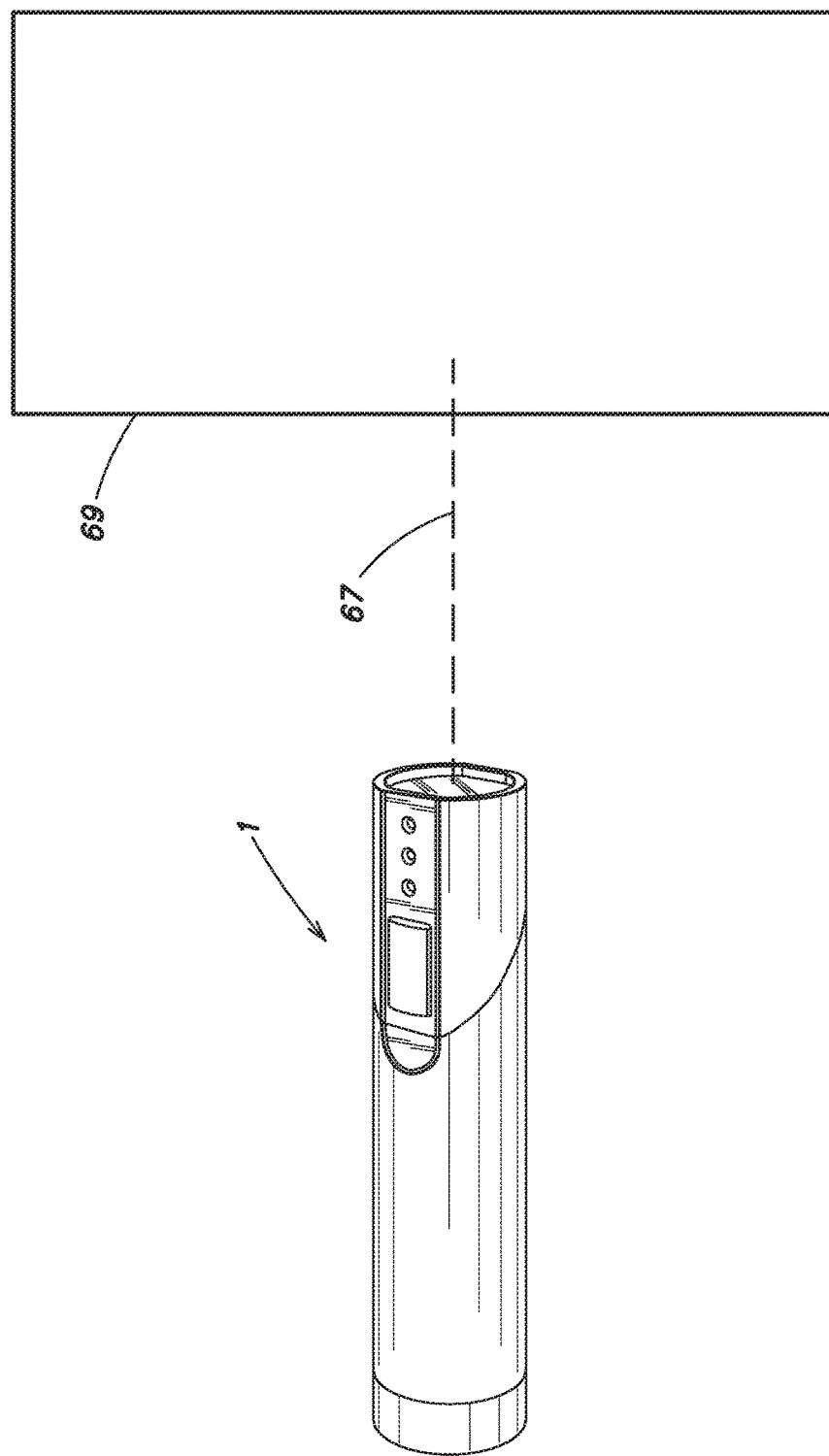
FIG. 3A is a side perspective view of a camera with a guide in one implementation of the present disclosure.
Figure 3B:
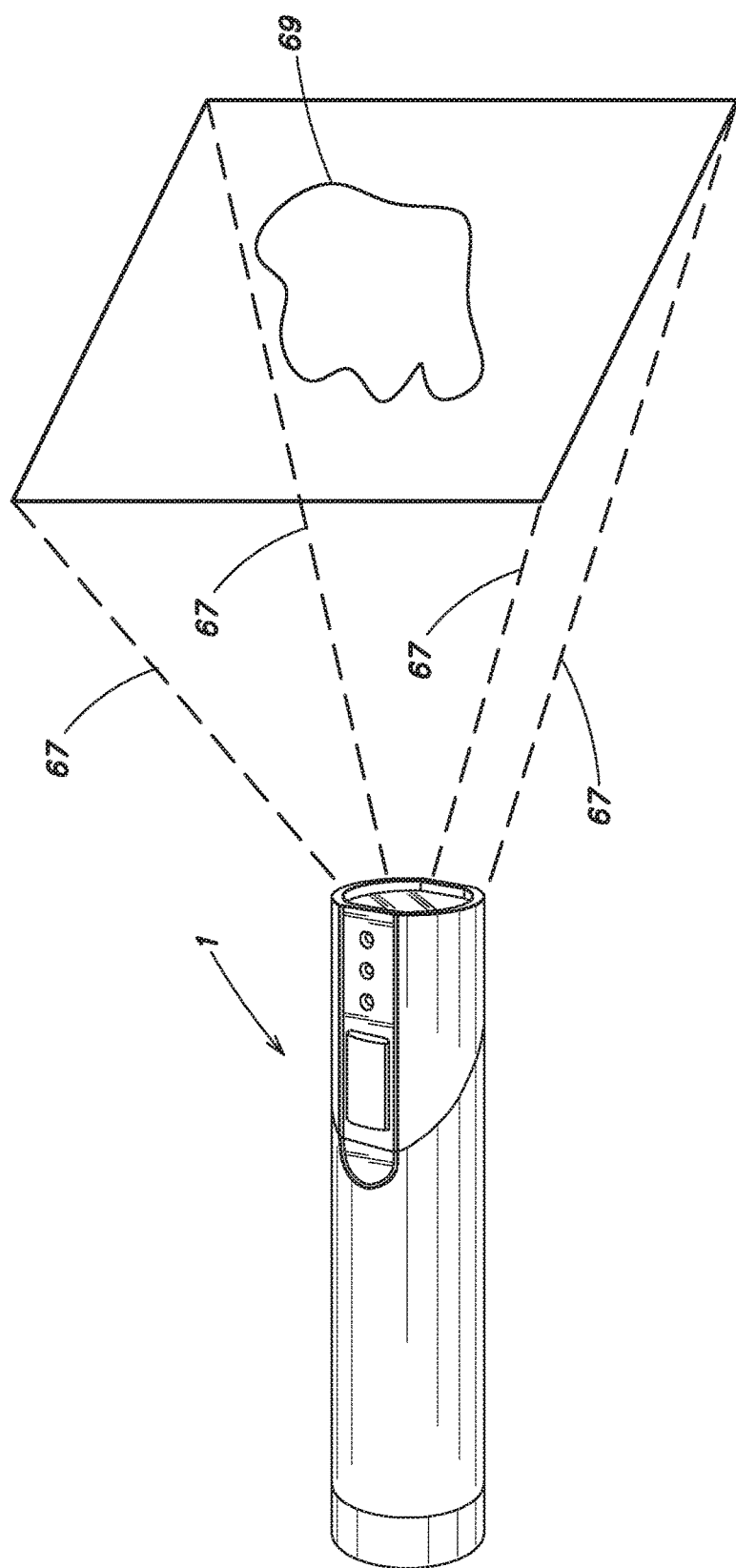
FIG. 3B is a side perspective view of a camera with a rectangular guide in another implementation of the present disclosure.

As shown, for example, in FIG. 1A, camera section 3 may comprise one or more buttons 9 for controlling the primary functions of the camera, such as powering the camera on or off, starting and stopping recordings, or controlling a guide, which may be, for example, a laser site, an LED site, or any other suitable type of light source for projecting a framing guide (as described below with respect to FIGS. 3A-3B). Multiple buttons may be employed to control the various functions of the camera or, alternatively, a single button may be configured in a manner to control multiple functions through unique user interactions (e.g. double-clicking or holding the button). Alternatively, camera 1 may employ a touch-sensitive surface to allow for gesture-based commands, in a manner familiar to one of ordinary skill in the art. Camera section 3 may also house camera components in its interior (not shown), and may comprise a camera lens 11 at its top side, in some examples. In some implementations, lens 11 may also be disposed in a recessed portion at an end of camera portion 3, so as to protect lens 11 from unwanted scratching and other wear and tear during normal camera use. Camera section 3 may further include one or more perforations 13 for permitting sounds to interact with an internal microphone, which may be an arrayed microphone, as discussed below with respect to FIG. 1D. As one of ordinary skill in the art will appreciate, however, buttons 9 and/or perforations 13 may be disposed elsewhere on camera 1 and need not be confined to camera section 3.

In other examples, camera 1 may be automatically activated based on an interaction by a user and without the need for buttons 9 to control activation. For example, camera 1 may be configured to activate when a user lifts it, shakes it, detaches it from a lanyard, or any other interaction, by using, for example, an accelerometer, gyroscope, touch sensor, voice activation, motion sensors, or a gravity sensor, in a manner known to one of ordinary skill in the art. In such examples, the opposite interaction or a corresponding interaction may be used for de-activating the camera, such as shaking it a second time, lowering it, placing it back on a lanyard, or using another voice command.

In other implementations, camera 1 may be tethered to an external computing device, such as a computer, laptop computer, tablet, or smartphone equipped with controlling software either through a wireless or cabled connection, as discussed below with reference to FIG. 1F. In such examples, an external device may control the functions of camera 1. Camera 1 may therefore operate as a stand-alone device, storing information on built-in memory, or it may operate in tandem with an external computing device in order to save, store, edit, and upload images and/or videos gathered from camera 1 using the capabilities of the external computing device.

Body section 5 may comprise a middle portion of camera 1. In some examples, body section 5 may include an elongate section having a cross-sectional shape and area that approximately matches the cross-sectional shape and area of camera section 3. As shown in FIG. 1A, in some implementations, body section 5 may also be generally cylindrical. Body section 5 may comprise a section that is spaced and arranged for use as a gripping portion for camera 1. Therefore, it may be sized and configured to be received within a user's hand comfortably, and in some examples, may have an effective diameter of approximately 2 cm, although no particular size or dimension is required, as one of ordinary skill in the art will appreciate. Body section 5 may further include one or more indentations 15, sized and arranged to improve a user's grip on the camera. For example, an indentation 15 may be disposed proximate camera section 3, which may serve as a grip point for receiving a user's thumb, when camera 1 is being held as one would hold a flashlight. In other examples, it may be advantageous to dispose an indentation 15 proximate one or more buttons 9 or on the underside of body section 5 for ease of use.

Attachment portion 7 may be disposed at an opposite end of camera 1 from camera section 3, in some examples. Attachment portion 7 may provide a point of attachment to a lanyard, necklace, and/or a charging cable. In some examples, attachment portion 7 may have a cross-sectional shape and area that approximately matches the cross-sectional shape and area of camera section 3 and/or body section 5. As shown in FIG. 1A, in some implementations, attachment portion 7 may be generally cylindrical as well.

Figure 1B:
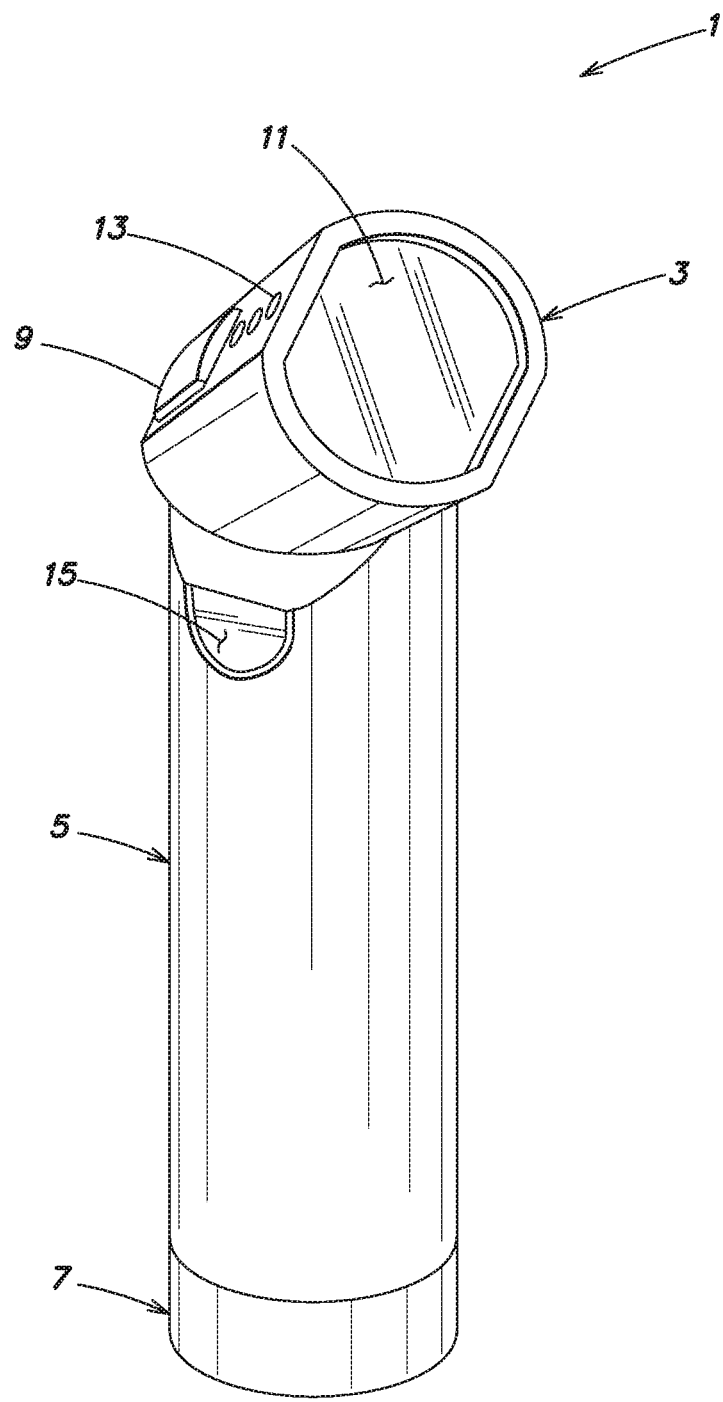
FIG. 1B is a front, top perspective view of a camera in one implementation of the present disclosure in a partially rotated position.
Figure 1C:
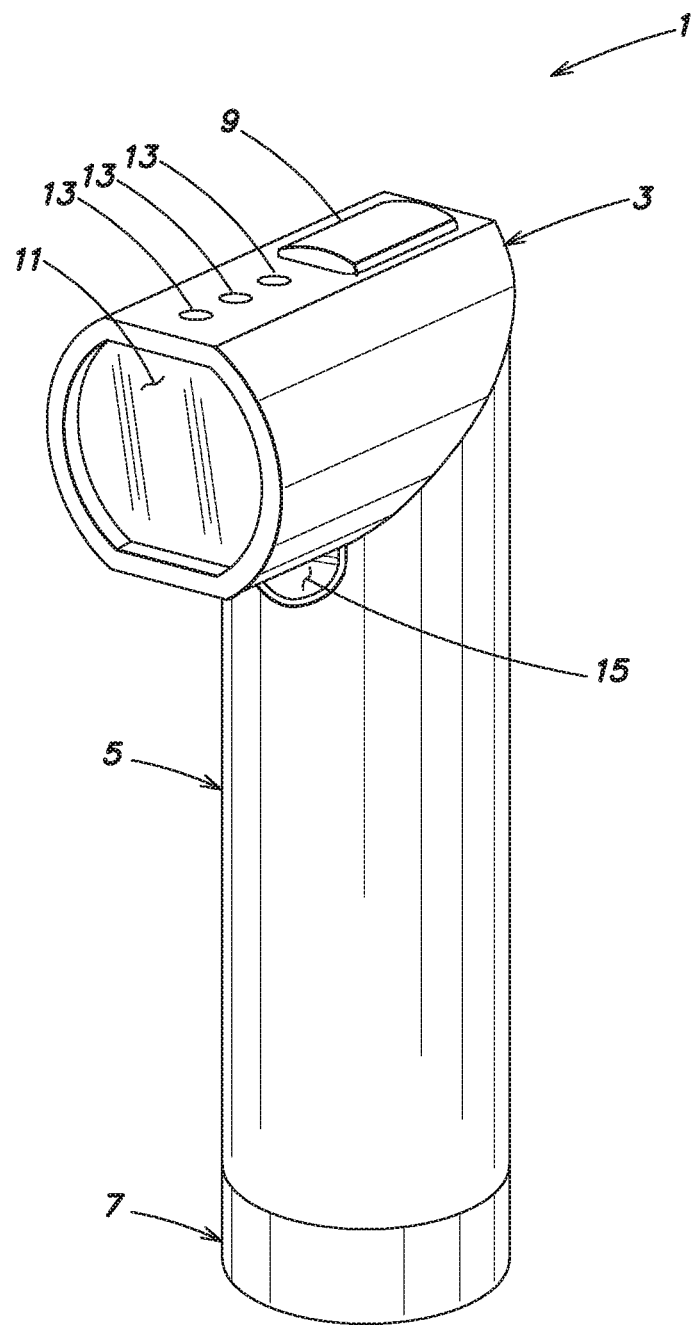
FIG. 1C is a front, top perspective view of a camera in one implementation of the present disclosure in a fully rotated position.

FIGS. 1B and 1C show front, top perspective views of a camera in one implementation of the present disclosure in partially and fully rotated positions, respectively. As shown, in some implementations, camera section 3 and body section 5 may be configured to rotate or swivel with respect to one another. In such examples, camera section 3 may be affixed to body section 5 through the use of an internal joint 17, as shown and described with respect to FIG. 1D, below. However, any suitable means for rotatably attaching camera section 3 to body section 5 may be employed, as one of ordinary skill in the art will appreciate. In some examples, camera section 3 and body section 5 may contact one another along an angled surface of camera section 3 and body section 5. In such examples, the lower surface of camera section 3 and the top surface of body section 5 may comprise angled surfaces forming roughly a 45-degree angle from horizontal as shown, for example, in FIG. 1B. However, any desired surface angles may be employed to achieve a desired rotation capability for camera section 3. In configurations where a 45-degree angle is used, the two angled surfaces may cooperate such that camera section 3 may form an angle with body section 5 of between 90-degrees (as shown in FIG. 1C) and 180-degrees (as shown in FIG. 1A). Of course, one of ordinary skill in the art will appreciate that any desired angle between 90-degrees and 180-degrees may be formed by only partially rotating camera section 3 around internal joint 17.

As camera section 3 rotates around body section 5, the orientation of camera section 3 may cause the camera to record images that are likewise rotated. This effect may be corrected through a software-implemented rotation compensation feature. In some examples, a rotation compensation feature may operate by receiving signals from an accelerometer or gyroscope, indicating a vertical direction regardless of the state of rotation of camera section 3. Based on the indicated vertical direction, software may be configured to crop the recorded images in a horizontal orientation so as to make the captured images appear level. In some examples, a rotation compensation feature may be combined with a feature recognition and/or content awareness capability to identify the desired subjects of the video or image and potentially adjust the cropped portion of the image to ensure that the desired subjects of the video or image are not lost during the cropping process. In other examples, a feature recognition and/or content awareness capability may help identify a correct horizontal orientation of the image, for example, based on a horizon, vertical doorways, or vertical trees detected in the image. In other examples, a rotation compensation feature may also be combined with a video-stabilization feature, whereby camera shaking may be detected by an accelerometer or a gyroscope and the recorded images may be cropped in response to the detected shaking so as to provide a smoother recording.

In some examples, joint 17 may comprise a sound-activated servo, which may be configured to direct the focus of camera section 3 towards any active sounds in the area. In such implementations, a sound-activated servo may be configured to receive directional information relating to surrounding sounds from an arrayed microphone, as discussed below with respect to FIG. 1D. By employing a sound-activated servo, camera section 3 may provide for hands-free filming in situations where sounds will generally be emanating from a location to be filmed. In other implementations, joint 17 may comprise a releasable joint, such as a releasable ball socket. In such examples, camera section 3, itself, may be separable from body section 5 and may provide an even smaller camera for filming in tight spaces during a facility inspection, for example. In such implementations, all of the operable components (or, alternatively backup components) for a camera, such as the camera hardware, storage, and a battery may be retained in camera section 3, itself, allowing it to operate independently from body section 5.

In some examples, camera 1 may include a software-implemented feature recognition capability by which a user may aim camera 1 towards a desired scene and select the feature recognition tracking capability. Once activated, the feature recognition capability may detect, through software techniques, the presence of faces or other features of interest within a scene, such as a ball in a game or a car, and generate signals for controlling a servo at internal joint 17 to maintain recognized features generally in the center of the camera's frame. In other examples, camera 1 may include a self-leveling feature, whereby a servo at internal joint 17 may be controlled by a motion detection device, such as an accelerometer, gyroscope, or other suitable means for detecting motion. In some examples, the servo motor may be controlled by an accelerometer or gyroscope or the like with the aid of a separate microcontroller programmed to make the necessary changes to the servo motor in response to signals from the accelerometer or gyroscope. In other examples, a main board 25 (described below with respect to FIG. 1D) may be programmed to accept signals from an accelerometer or gyroscope, and transmit self-leveling control signals to a servo motor at internal joint 17. In situations where a user wishes to maintain a level shot despite the user's own movement, a self-leveling feature may be activated. Where a user wishes to allow the camera's direction to move along with the movement of the camera, the self-levelling feature may remain deactivated.

As one of ordinary skill in the art will appreciate, the above-described form factor of camera 1 allows it to be set on a surface, such as a desk or table, to record video in numerous directions. This free-standing camera capability provides several advantages as one of ordinary skill in the art will appreciate. For example, the self-standing feature of camera 1 may be utilized to provide a mechanism for recording video and/or sound when a user is not free or does not wish to hold the camera in his or her hands. This feature may be employed, for example, when a user wishes to take notes during a lecture but also wishes to record the lecture. This feature may also be employed, for example, during an interview, in order to provide a hands-free conversational setting. In other examples, camera 1 may be utilized in a 90-degree configuration to record a scene or experience by holding the camera aloft for viewing over a crowd of people. Users filming scenes from such challenging vantage points with a smartphone have previously risked cracking or otherwise damaging their devices by dropping them, whereas there is less risk of damaging camera 1 which may be adapted for filming from such challenging vantage points.

Figure 1D:
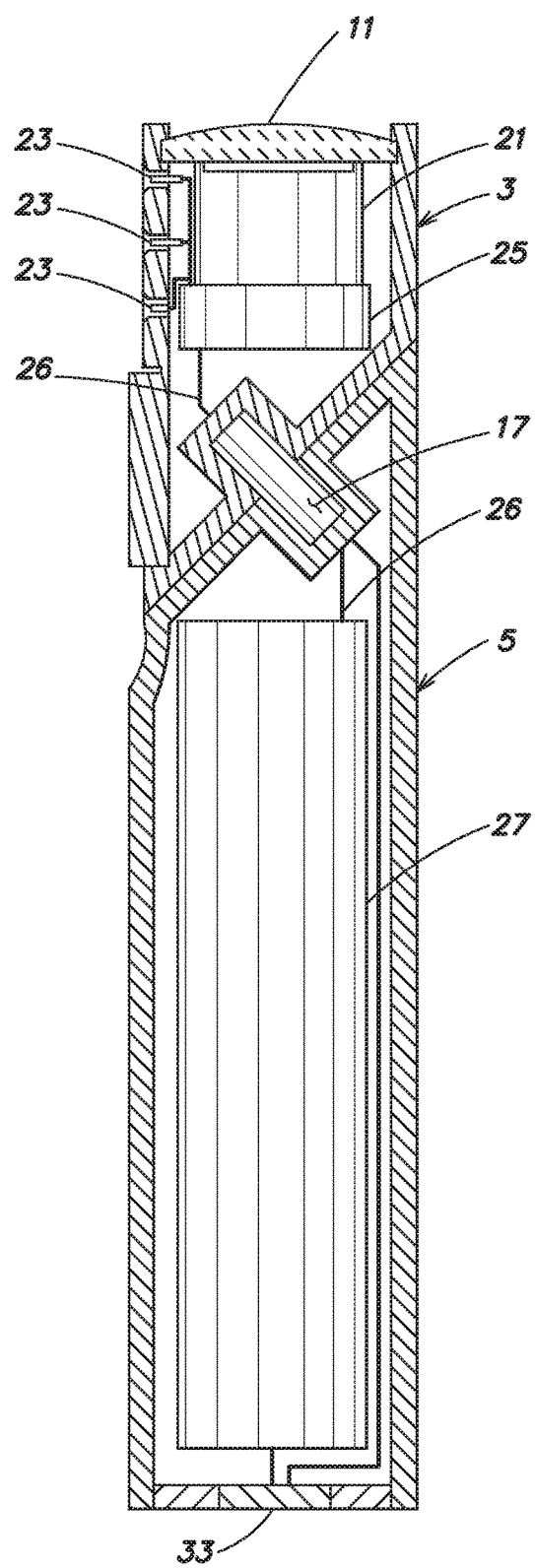
FIG. 1D is a cross-sectional view of a camera in one implementation of the present disclosure.

FIG. 1D is a cross-sectional view of a camera in one implementation of the present disclosure. As shown, camera section 3 is disposed at a top portion of camera 1, while body section 5 is generally disposed at a bottom portion of camera 1. Camera section 3 comprises an external lens 11, which may be a single optical lens or an assembly of multiple lenses designed and configured to work in tandem. External lens 11 is disposed above camera module 21 which may comprise, in some examples, a shutter, a plurality of internal optical lenses for providing a zooming feature, a lens mount, and/or an imager for capturing a digital representation of a video feed. Camera module 21 may be coupled to main board 25, which may include memory, non-volatile memory, one or more processors programmed to control the operations of camera 1, as well as wired and/or wireless communications hardware in order to enable one or more wired and/or wireless connections such as USB, Bluetooth, and/or Wi-Fi.

Camera section 3 may also include an arrayed microphone 23, which may be, in some examples, disposed within perforations 13. Arrayed microphone 23 may comprise a plurality of omnidirectional microphones, directional microphones, or any mixture thereof, distributed about the interior of camera section 3. Arrayed microphone 23 may be coupled to main board 25 for simultaneous processing of the signals from each individual microphone in a manner familiar to one of ordinary skill in the art, prior to recording the sounds and potentially for controlling one or more sound-activated servos. Arrayed microphone 23 may employ beamforming or other techniques to achieve directionality in a particular direction, for example, towards the sound to be captured. Arrayed microphone 23 may also be useful for annotating a scene or experience while recording it. For example, arrayed microphone 23 may be configured to record sounds originating at or near the device while recording images that are distal from the device. This may allow a user to annotate a scene, such as a judge providing commentary on a performance, in real-time, during a competition. Arrayed microphone 23 may also be configured to record a plurality of audio tracks representing, for example, sounds proximal to camera 1 and sounds distal from camera 1, which sounds may be separately processed and/or edited after recording. Multiple audio tracks may also be combined from various devices such as a narration track from the headphones (with a microphone) of the camera operator and directional sound coming from the camera target, using arrayed microphone 23. Each track may be edited and/or adjusted separately prior to being compiled into a single video or audio file.

As shown in FIG. 1D, power and electronic signals may pass to and from main board 25 via wiring 26, which may pass through internal joint 17, which may be substantially open or include an opening to accommodate wiring 26. In examples where internal joint 17 comprises a swiveling connector, wiring 26 may pass between camera section 3 and body section 5 without being twisted. Thus, camera section 3 may continue to receive power from battery 27 in body section 5 regardless of the rotational position of camera section 3 with respect to body section 5. Battery 27 may comprise any suitable battery known to one of ordinary skill in the art including lithium ion, lithium polymer, nickel cadmium, nickel metal hydride, or any other suitable, compact battery as known to one of ordinary skill in the art. Magnet 33 may be disposed at a bottom end of body section 5 and, in some examples, may be embedded within the housing of body section 5. In some examples, magnet 33 may allow body section 5 to removably attach to attachment portion 7 and/or allow for the transmission of power and/or data between attachment portion 7, and the other components of camera section 3 and/or body section 5.

FIG. 1E is a front, lower perspective view of a camera in one implementation of the present disclosure with attachment portion 7 detached and a power/data cable 39 detached. As shown, attachment portion 7 may be attached to body section 5 via one or more magnets 33. However, one of ordinary skill in the art will appreciate that any suitable form of removable attachment may be utilized such that the body section 5 and/or camera section 3 may be quickly removed or detached from attachment portion 7 in order to utilize camera 1. Other suitable forms of removable attachment include, but are not limited to, a clip, a snap fastener, a bayonet mount, or screwing body section 5 into attachment portion 7. In examples where one or more magnets are employed, body section 5 may freely rotate at its connection point to attachment portion 7, which may allow for camera 1 to be positioned for filming by a user, even while attached to attachment portion 7 or even while hanging freely from a lanyard around a user's neck.

As shown, for example, in FIG. 1E, the bottom surface of attachment portion 7 may be configured to receive one or more ends of a charging cable. For example, slot 35 may be configured to receive a first end of a data and/or power cable connector, such as a USB connector, micro USB cable connector, or any other suitable connector used to transfer power and/or data between computing devices, whereas slot 37 may be configured to receive a second end of a data and/or power cable. As one of skill in the art will appreciate slots 35 and 37 may be configured for receiving any suitable form of charging cable and is not limited to any particular technologies, such as a USB cable. By providing a receiving slot for both ends of a cable connector, attachment portion 7 allows for convenient charging of camera 1. For example, a user desiring to charge the camera may simply remove power/data cable 39 from slot 35 and plug it into a charging source, such as a computer or AC adapter, while leaving the charging end of the charging cable inserted in slot 37 to allow the device to charge. Furthermore, because attachment portion 7 provides a slot for both ends of a charging cable, the charging cable, itself, may act as a lanyard for camera 1. When a user wishes to use the camera, they may simply detach attachment portion 7 from body section 5 for use. As one of skill in the art will appreciate, however, the force required to detach attachment portion 7 from body section 5 may be less than the force required to remove the charging cable from either of slots 35 or 37 in order to avoid unintended detachment of power/data cable 39.

As previously described, in an inserted state, power/data cable 39 may form a loop which may be used as a lanyard for holding camera 1 around a user's neck. A slider 41 may optionally be installed on the charging cable in order to provide a means for enlarging or reducing the size of the charging cable loop for the comfort of the user, or for securing the loop around another surface having a different size. Slider 41 may comprise a wire loop in some examples, or may comprise a rigid structure formed with one or two eyelets for receiving two sections of power/data cable 39. In some examples, power/data cable 39 may be covered with a softer material in order to improve its appearance and wearability. Suitable materials include, but are not limited to, cloth, canvas, leather, rubber, silk, or wool, among others. In other examples, power/data cable 39 may be coated with a desired material, such as Ethylene tetrafluoroethylene (ETFE), for example, so that adhesion between the cable or lanyard and the wearer's clothing or skin is reduced thereby reducing skin irritation that may be caused by a charging cable 39 rubbing against a user's neck or other body part. In the absence of such coatings, a charging cable 39 may cause rashes or other skin irritations due to friction between the wearer and the charging cable.

Figure 1F:
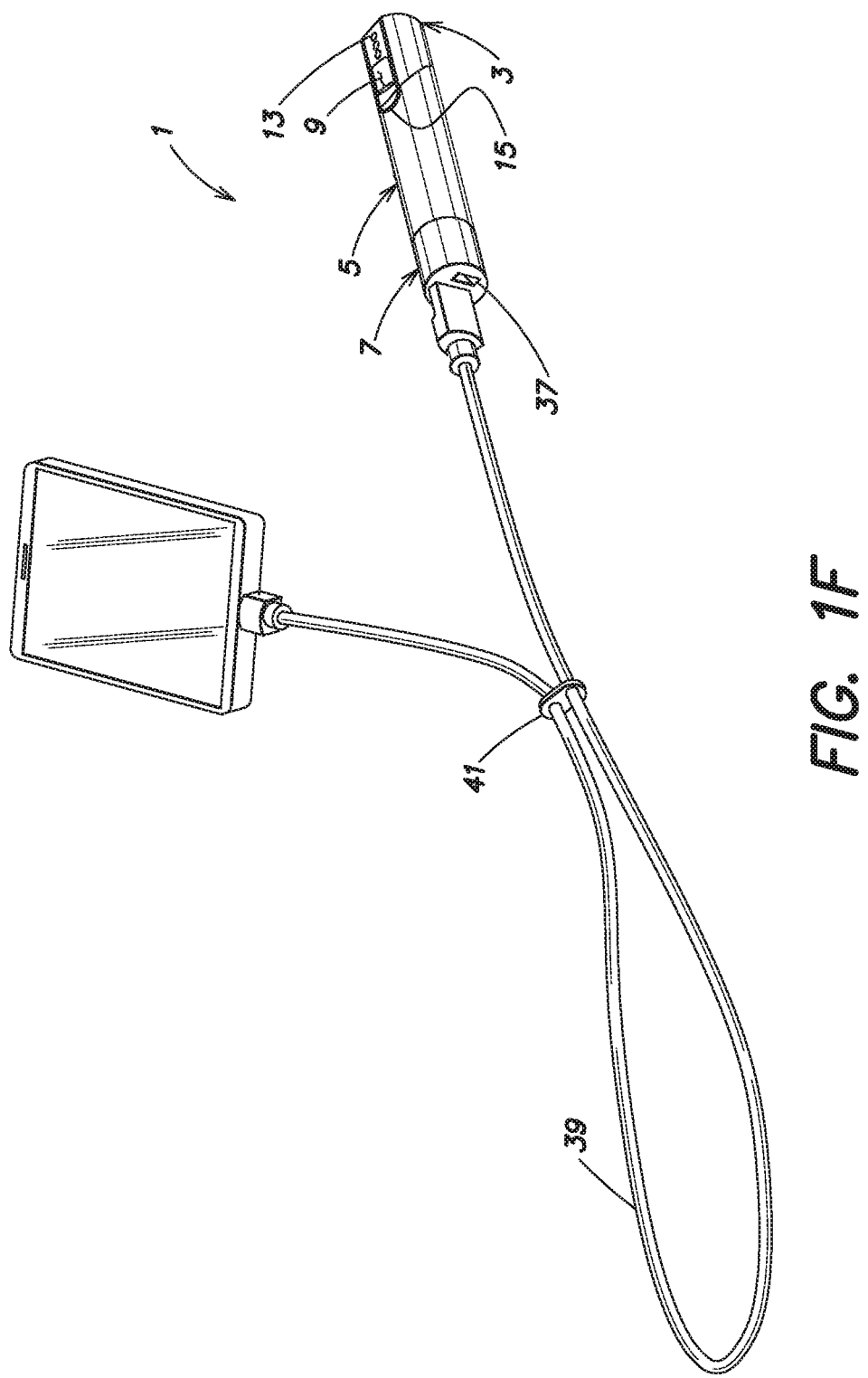
FIG. 1F is a side, lower perspective view of a camera in one implementation of the present disclosure with an attachment portion attached and with a power/data cable connected to an external device.

FIG. 1F is a side, lower perspective view of a camera in one implementation of the present disclosure with an attachment portion attached and with a power/data cable connected to an external device. As shown, camera 1 may be tethered to an external computing device, such as a computer, laptop computer, tablet, or smartphone equipped with controlling software either through a wireless or cabled connection. Where a wired connection is utilized, attachment portion 7 provides a convenient means for coupling and decoupling a data and/or power cable 39 to an external device. For example, in one implementation, a user may simply remove one end of a data and/or power cable 39 from attachment portion 7 and insert it into a port on an external device or power source. When charging and/or data transfers are completed, a user may detach data and/or power cable 39 from the external device and re-couple it to attachment portion 7.

Figure 1G:
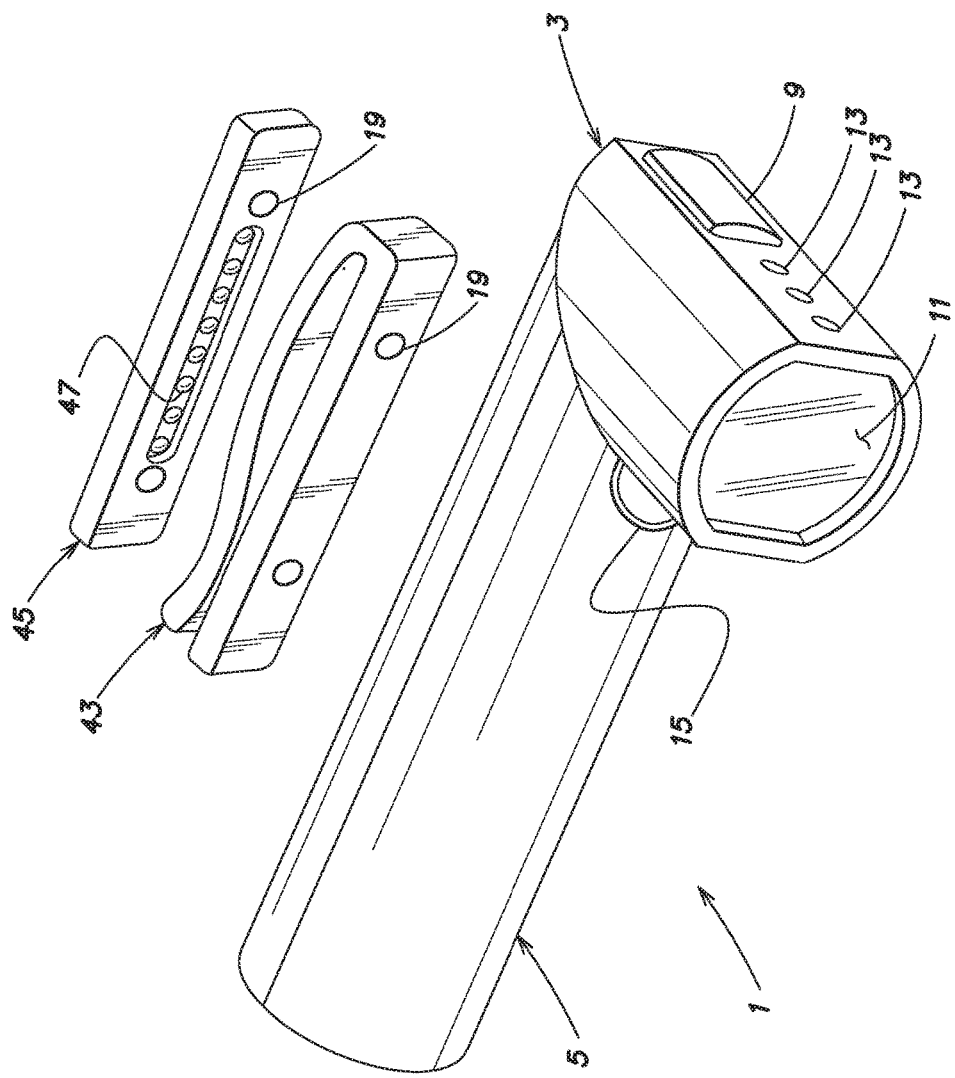
FIG. 1G is a side, top perspective view of a camera in one implementation of the present disclosure, along with exemplary attachment accessories.
Figure 1H:
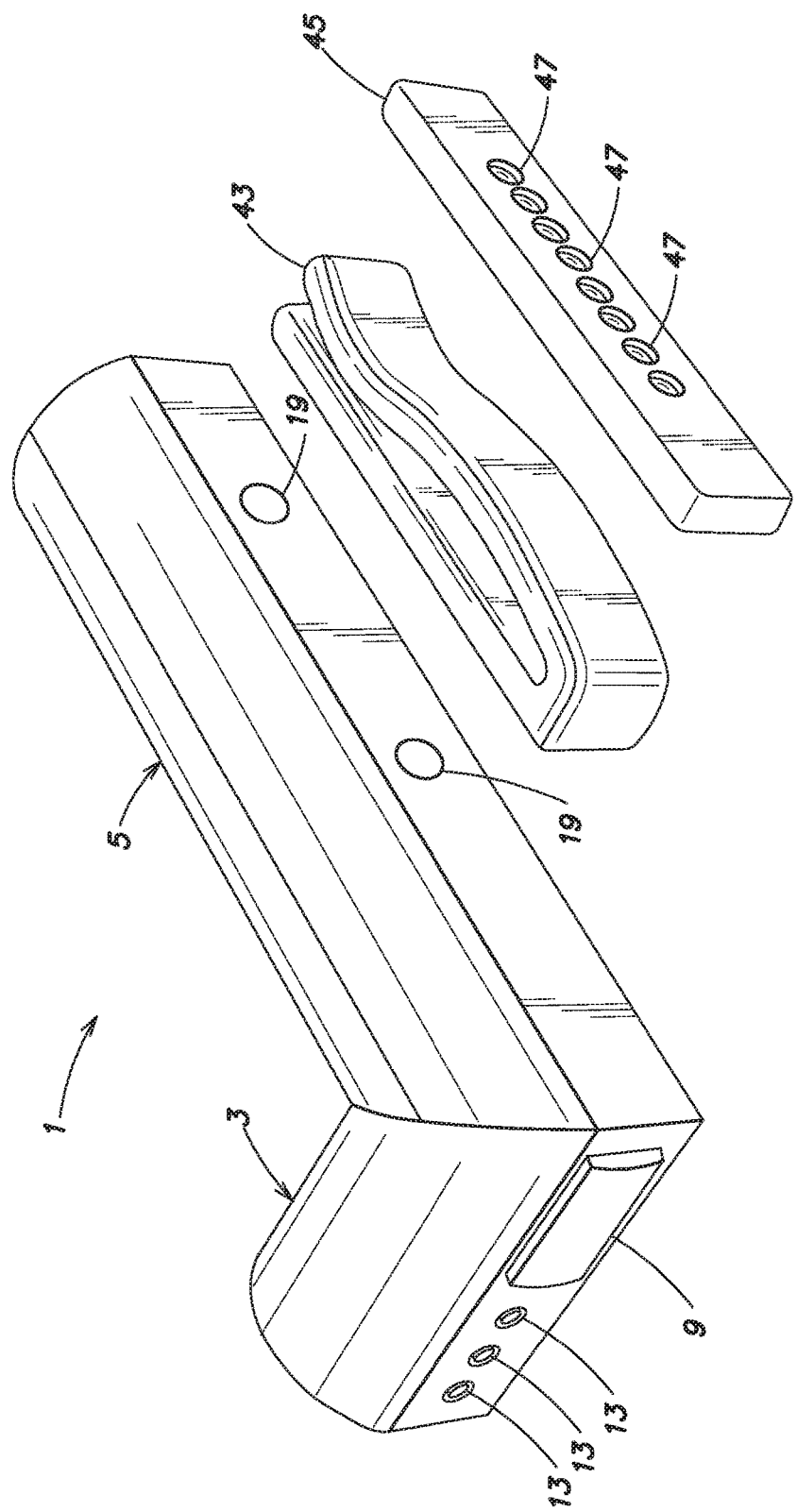
FIG. 1H is a rear, top perspective view of a camera in one implementation of the present disclosure, along with exemplary attachment accessories.

FIGS. 1G and 1H show front and rear perspective views of a camera in one implementation of the present disclosure, along with exemplary attachment accessories. As shown in FIG. 1H, camera 1 may include one or more connection points 19 to allow camera 1 to be removably mounted on any number of surfaces or structures. In some examples, connection points 19 may be one or more magnetic or metallic surfaces for engagement with a receiving metallic surface or magnet. Other implementations may allow for other forms of removable attachment, such as Velcro, clips, fasteners, or locks. Attachment accessories may include a clip 43, which may be mounted along a side of body section 5 using connection points 19. In other examples, clip 43 may be permanently fixed to body section 5 using adhesives, fasteners, or by being integrally formed with body section 5. Clip 43 provides a means for removably mounting camera 1 on various surfaces or on accessories worn by a user, such as headphones, clothing, a backpack, or a purse.

Camera 1 may also include a connection strip 45 as shown, for example, in FIGS. 1G and 1H. Connection strip 45 may be mounted on body section 5 in a similar manner as clip 43. Connection strip 45 may provide another means for mounting camera 1 on various surfaces via dimples 47. Dimples 47 provide a means for stitching connection strip 45 to any number of garments or apparel items in order to provide a fixed connection point to any desired garment or apparel items, again, utilizing connection points 19. Likewise, clip 43 and/or a connection strip 45 may be used to mount other accessories onto camera 1. For example, camera 1 may include an attachable light for increasing visibility in dark settings which may be attached or removed using clip 43 and/or connection strip 45. In other examples, a light may be permanently affixed to camera 1 or integrally formed with it.

Figure 1J:
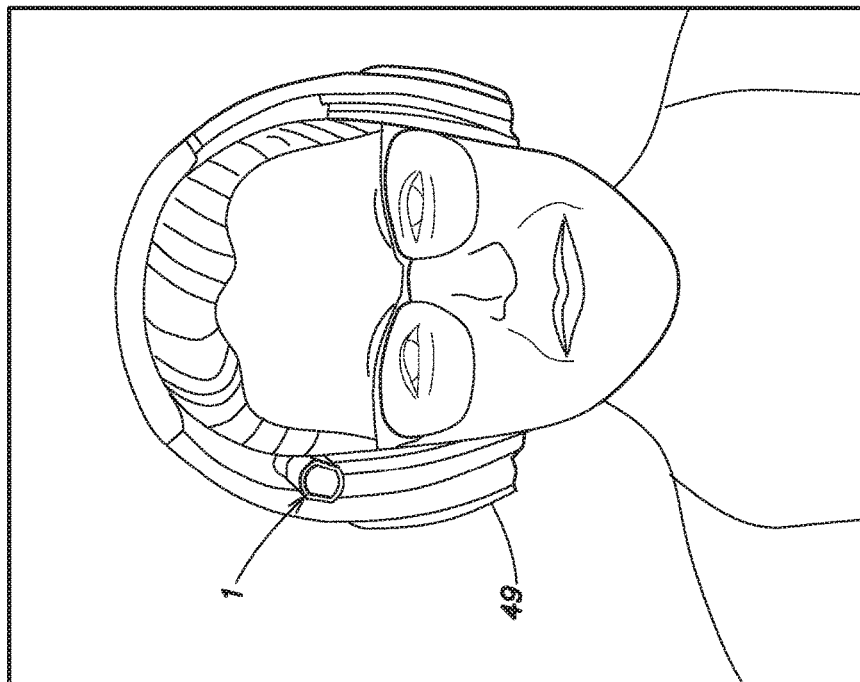
FIG. 1J is a front view of a camera mounted onto headphones in one implementation of the present disclosure.
Figure 1I:
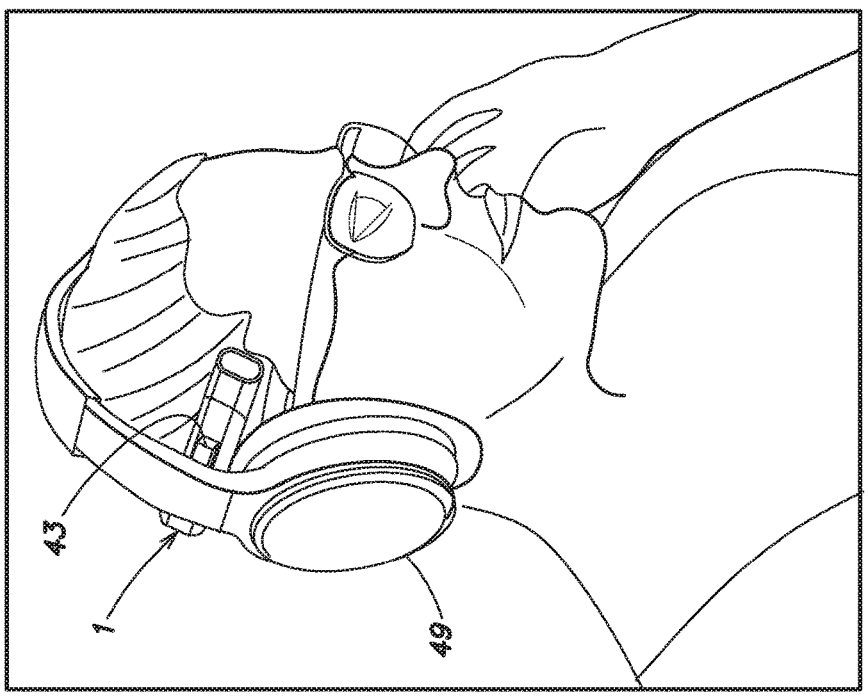
FIG. 1I is a side view of a camera mounted onto headphones in one implementation of the present disclosure.

In some examples, one or more cameras 1 may be mounted onto headphones 49 as shown, for example, in FIGS. 1I and 1J. While camera 1 is shown in FIGS. 1I and 1J as being mounted to a headband of headphones 49, camera 1 could alternatively be mounted to an ear cup (for on-ear or around-ear headphones) or earbud (for in-ear headphones), or other areas of headphones 49. In other examples, camera 1 may be mounted to a piece of stiff, deformable wire material that may be configured to fit around the ear of a user or any other desired surface. Camera 1 may be mounted using clip 43, connection strip 45, or by directly engaging magnets and/or metal surfaces on a set of headphones with one or more connection points 19. In such configurations, camera 1 may be configured to record video and/or images from scenes or experiences, as viewed by the wearer in real-time, based on the direction in which the wearer is looking. For example, in some applications, camera 1 may be mounted on headphones 49 in order to provide a live demonstration during a streaming view conference from the wearer's perspective, for example, while the wearer uses a whiteboard or similar presentation equipment. In other examples, a user may live-stream an event using one or more headphone-mounted cameras. In some examples, the arrayed microphone 23 may also provide highly focused sound recorded by the arrayed microphone either directly to headphones 49 or via a smart phone or other similar device, allowing the wearer to listen to targeted or distant sounds while wearing camera 1. As one of skill in the art will appreciate, however, using clip 43, connection strip 45, and/or connection points 19, camera 1 may be mounted for recording from a wide array of vantage points, such as drones, pets, machines, or structures. Camera 1 may also be mounted on any number of items using the above-described techniques. For example, camera 1 may be mounted on a hat, a helmet (e.g. for a soldier, construction worker, or any type of athlete), glasses, shoulder or neck-worn personal audio devices, backpacks, shoes, or any other surface from which it may be useful to record images and/or sounds.

In one implementation of the present disclosure, two or more of camera 1 may be mounted together in order to record three-dimensional video. In such examples, a plurality of cameras 1 may be used to record multiple video streams from multiple perspectives, such as left and right sides of headphones 49. The recorded video streams may be stored separately and later processed to generate a single, three-dimensional video, or the plurality of video streams may be transmitted directly to a processing device for instantaneous combination into a single three-dimensional video stream, in a manner familiar to one of ordinary skill in the art. Such techniques may be particularly useful in combination with a virtual reality headset, which may digitally augment a user's ability to observe their surrounding environment. For example, using a virtual reality headset, a plurality of cameras 1, and arrayed microphone 23, a user may observe sights and sounds that are distal from the user as if they are nearby.

Figure 2A:
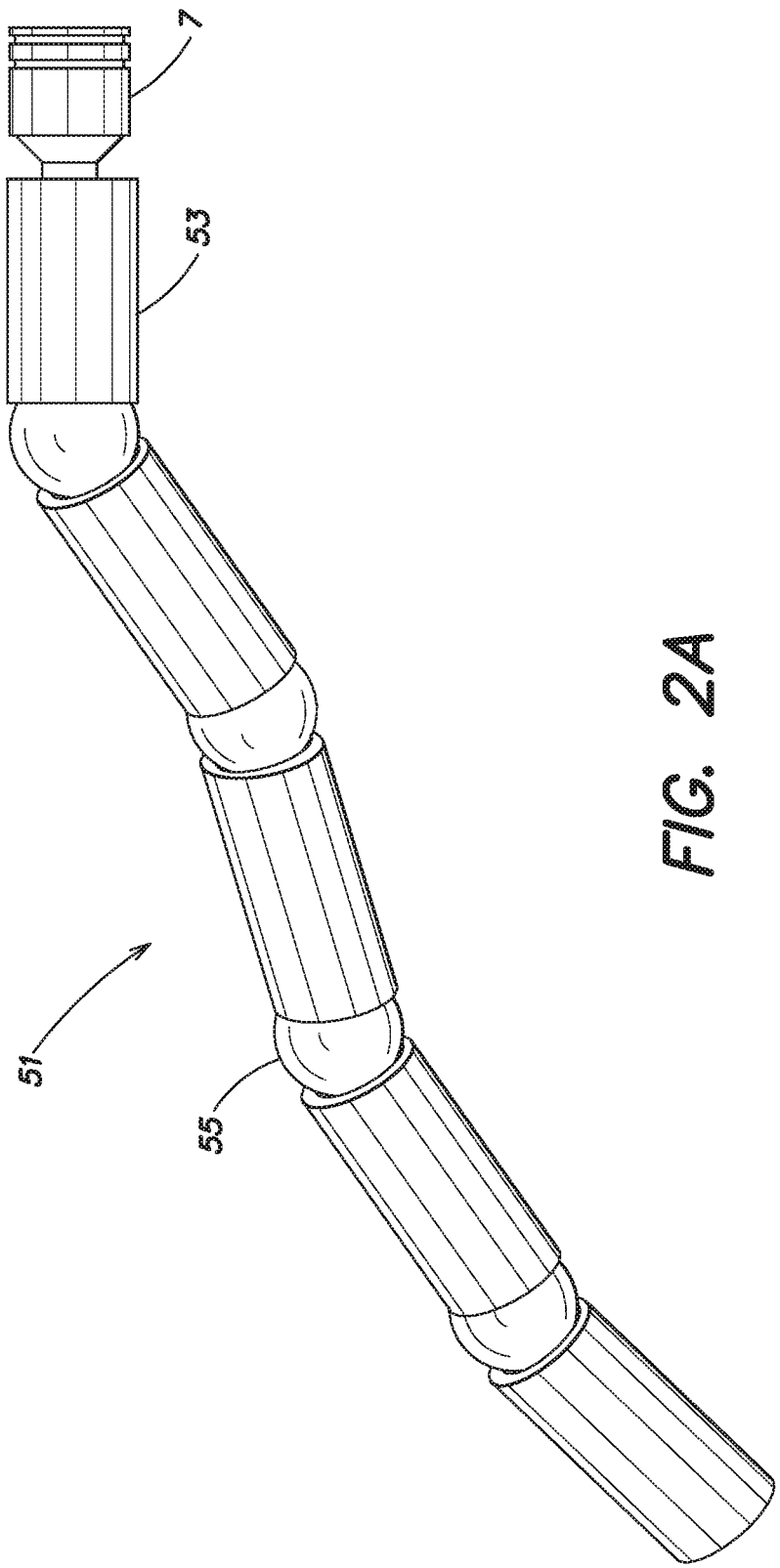
FIG. 2A is a side view of a configurable lanyard in one implementation of the present disclosure.

FIG. 2A is a side view of a configurable lanyard 51 in another implementation of the present disclosure that allows a user to hold camera 1 in an extended position away from a user. As shown, configurable lanyard 51 may include an attachment portion 7 at one end of the lanyard for receiving and fixedly holding camera 1 at an end of the lanyard. Attachment portion 7, in this example, may be attached to a series of interconnected, hollow spacers 53, and spherical joints 55. Any number of spacers and spherical joints may be employed to achieve a desired length for the configurable lanyard. In some implementations, hollow spacers 53 may be a substantially hollow cylindrical length formed of any suitably rigid materials, such as metals, plastics, composites, or hardened rubber. In some examples, hollow spacers 53 may have a cross-sectional shape and size that is substantially similar to that of camera 1 and, in some examples, may have an effective outer diameter of approximately 2 cm. However, in other configurations, hollow spacers 53 may have an effective diameter of between 6 mm and 4 cm.

Spherical joints 55 may be disposed between each spacer in order to allow the spacers to partially rotate around the spherical joints and may be comprised of the same types of materials as described above with respect to hollow spacers 53. Spherical joints 55 should be sized and dimensioned in proportion to the dimensions of the hollow interior or hollow spacers 53. If spherical joint 55 has an outer diameter that is too large, its ability to function as a joint may be diminished. On the other hand, if spherical joint 55 is too small, spacers 53 may either envelope the spherical joint or have insufficient space in which to partially rotate around the spherical joint. Thus, spherical joint 55 should be proportionally larger than hollow spacer 53 and, in some examples, may have an outer diameter that is between 10% and 200% larger than the effective outer diameter of hollow spacer 53.

Figure 2B:
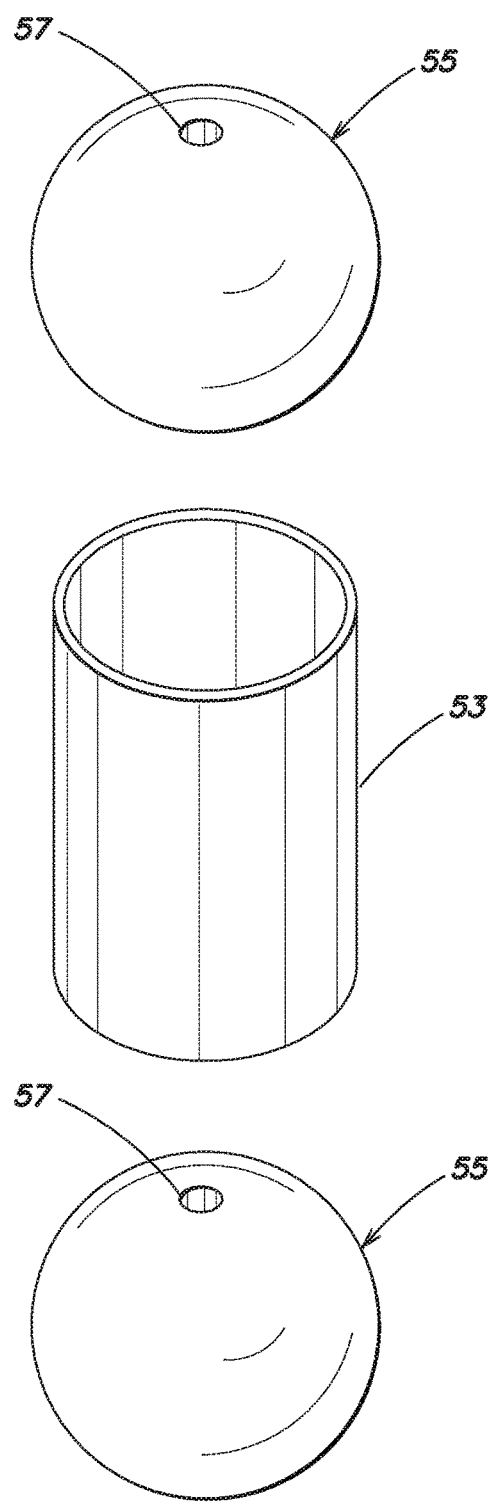
FIG. 2B is an exploded view of a section of a configurable lanyard in one implementation of the present disclosure.

FIG. 2B shows an exploded view of one section of a configurable lanyard 51 in one implementation of the present disclosure. As shown, each spherical joint 55 may be separated from another by a hollow spacer 53. Spherical joints 55 also includes a channel 57 through which a tensioning cable (not shown) and a charging cable 39 (not shown) may extend, while also extending through the interior of hollow spacer 53.

Figure 2C:
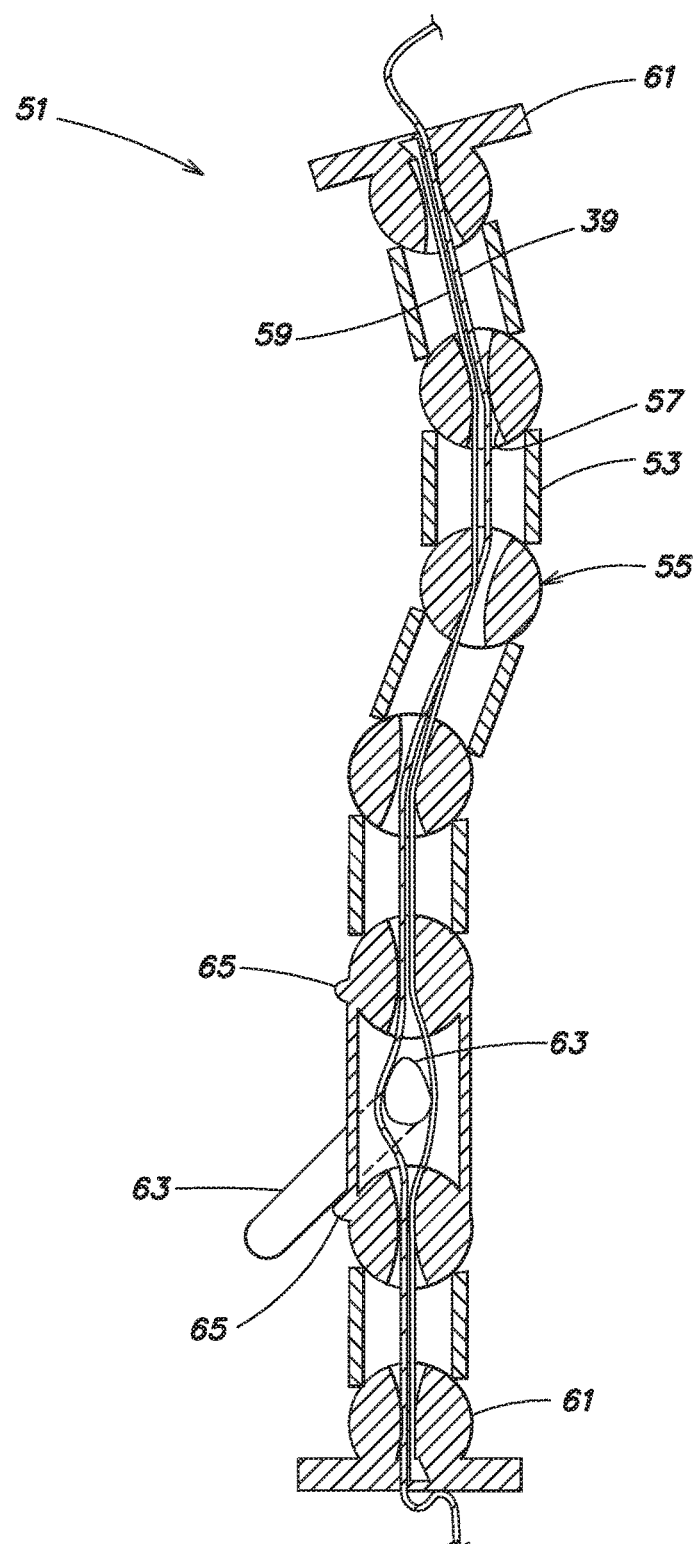
FIG. 2C is a cross-sectional view of a configurable lanyard in one implementation of the present disclosure in a slack position.
Figure 2D:
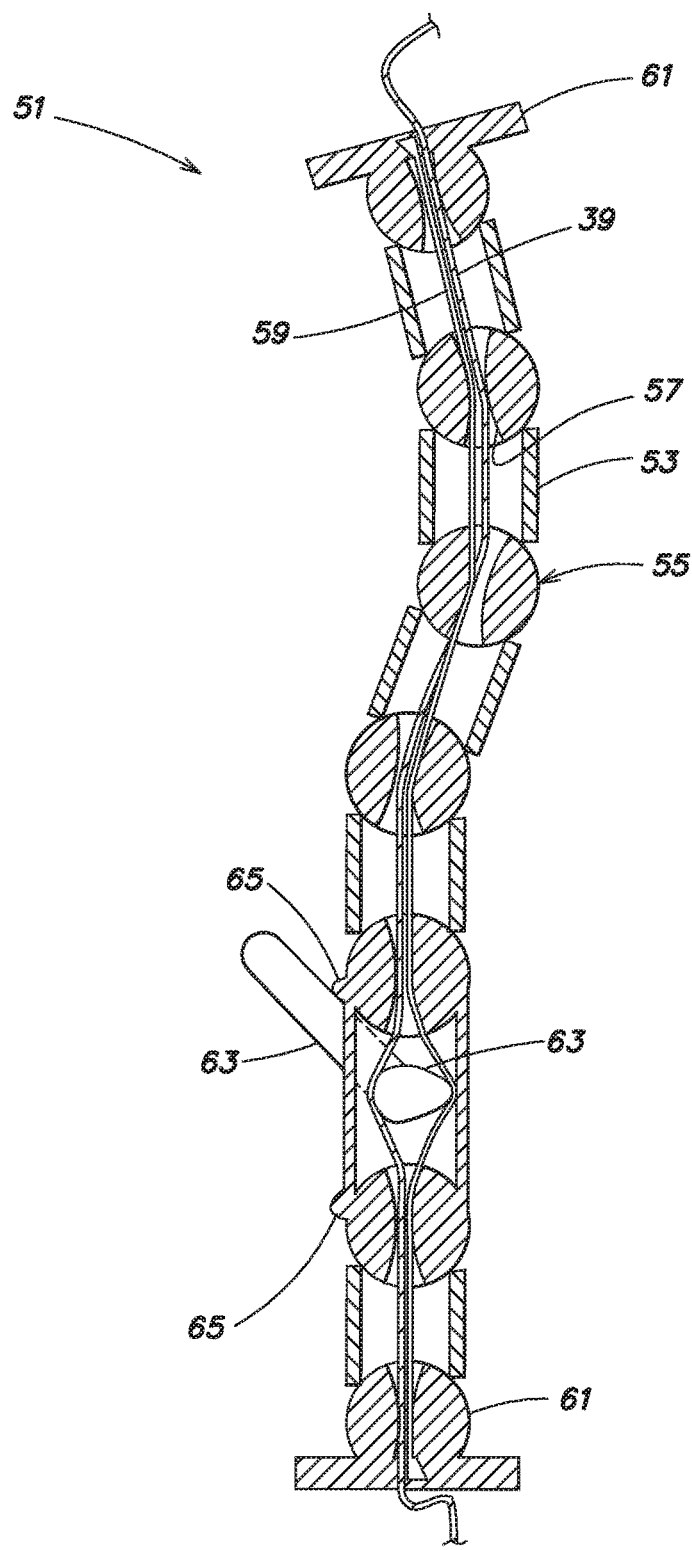
FIG. 2D is a cross-sectional view of a configurable lanyard in one implementation of the present disclosure in a taut position.

FIGS. 2C-2D provides a cross-sectional view of configurable lanyard 51 in one implementation of the present disclosure in a slack position and taut position, respectively. As shown, a tension cable 59 may be threaded through each of a series of hollow spacers and spherical joints along the length of a configurable lanyard and may be anchored in lanyard end pieces 61. Lanyard end pieces 61 may be configured to removably attach to one another, for example, through the use of magnets, in order to form a temporary loop for carrying. A charging and/or data cable 39 may also pass through each of a series of hollow spacers and spherical joints but may not be anchored within the lanyard end pieces 61, instead passing loosely through the end pieces. The tension cable may selectively be placed under tension, allowing the charging and/or data cable 39 to remain slack and not placed under strain.

While the lanyard remains slack, and prior to applying tension, it hangs slack and may be draped into any desired position. When the lanyard is "locked," the locking compression force exerted between and among the spherical joints and spacers is high enough to allow the lanyard to support the weight of the camera when fully extended in a horizontal position. However, the locking compression force is still low enough that the user may move or bend the lanyard into new configurations for holding camera 1 in a desired manner. A user may, for example, fashion the lanyard into a substantially straight pathway for holding camera 1 aloft above a crowd or to inspect a high place or for use as a "selfie" stick. Alternatively, lanyard 51 may be wrapped around a surface to hold camera 1 in a desired position, such as a tree branch or a desired position on a piece of equipment. In a slack configuration, the lanyard may also be worn around a user's neck without applying tension to the lanyard.

Tension may selectively be applied to tension cable 59 through the use of, for example, a cable tension cam 63, which may be disposed within one of the series of hollow spacers. Cable tension cam 63 acts upon the tension cable 59 by selectively rotating it into a position that displaces tension cable 59, thereby placing it in tension and compressing the series of hollow spacers 53 and spherical joints 55 of the lanyard. When the tension cable is under tension, the lanyard components may compress and become substantially rigid, allowing the lanyard to support camera 1 at its end in a desired configuration. In some examples, approximately 20 pounds of tension force may be sufficient for holding lanyard 51 in a rigid position, although more or less tension may be applied, according to the needs of a particular design and taking into account the length of the lanyard and the weight of camera 1. A lever may extend from the tensioning cam to the exterior of the configurable lanyard to provide a mechanism for a user to selectively place the tension cable into tension, as shown, for example, in FIG. 2D. Modified spherical joints adjacent the hollow spacer retaining the tension cam 63 may also include stoppers 65 which, in some examples, may comprise projections on a spherical joint that are sized and arranged to impede the rotational movement of the lever. Once tension cable 59 is placed into tension, the compression of hollow spacers 53 and spherical joints 55 against one another causes the configurable lanyard to become rigid, holding the shape previously configured by the user. Other alternatives could be used for applying tension to cable 59, such as a bellcrank, two tension cables between a tensioning cam, or any other suitable mechanism of selectively applying tension to a tensioning cable that is anchored at both ends.

Camera 1 may include additional features to aid in filming scenes or events without the aid of a viewing screen to monitor filming. As shown in FIGS. 3A-3B, camera 1 may also include guides 67 which may permit a user to gauge the direction of lens 11 with respect to a target 69. In some examples, guide 67 may comprise a single laser or LED pointer that provides an indication as to the approximate center of the filming window for the device as shown, for example, in FIG. 3A. In such implementations, guide 67 may be provided via a single laser or LED pointer mounted on either the exterior of the device or on the interior behind lens 11. In other examples, guide 67 may provide a laser or LED box (or portion thereof) that approximates the actual view being recorded by the device as shown, for example, in FIG. 3B. The laser or LED box may be, for example, four corners of the viewing area being recorded by the device, an outline of the viewing area, or an overlay of lighting on the entire viewing area. In some examples, only two laser or LED pointers may be utilized to indicate two diagonally opposing corners of a recording window. In some examples, a plurality of lasers or LEDs may be positioned on the interior of camera section 3 and behind lens 11 thereby allowing the laser guide 67 to expand or contract automatically as the device is optically zoomed. In some examples, it may be advantageous to render guide 67 visible only to the user of camera 1, such as when guide 67 would be perceived as impolite, obtrusive, or threatening. In such examples, guide 67 may be configured to be visible only to a user, such as by employing infrared or polarized light such that guide 67 may only be viewable through the use of glasses, a viewer configured to detect such light, or a separate computing device. By allowing a user to monitor the images being recorded without the aid of a viewing screen, such as on a smart phone, users may engage with the events and scenes they are recording in a more meaningful way and without being separated from their subject by a screen.

While the disclosed subject matter is described herein in terms of certain exemplary implementations, those skilled in the art will recognize that various modifications and improvements can be made to the disclosed subject matter without departing from the scope thereof. As such, the particular features claimed below and disclosed above can be combined with each other in other manners within the scope of the disclosed subject matter such that the disclosed subject matter should be recognized as also specifically directed to other implementations having any other possible permutations and combinations. It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

The invention claimed is:

1. A camera comprising:
a camera section, comprising a housing, a camera, and a lens;
a body section, comprising a housing;
wherein said camera section and said body section are configured to contact one another along a first angled surface of the camera section and a second angled surface of the body section;
a joint for connecting said camera section to said body section, wherein said joint allows said camera section to rotate at said first and second angled surfaces; and
an attachment portion that removably attaches to said body portion through the use of one or more magnets, wherein said attachment portion is capable of receiving at least one end of a charging and/or data cable.

2. The camera of claim 1 wherein said body section further comprises a battery.

3. The camera of claim 1 wherein said first and second angled surfaces comprise planar surfaces having an angle of between 35 and 55 degrees from horizontal when the camera is in a vertical position.

4. The camera of claim 3 wherein said joint allows said camera section and said body section to rotate with respect to one another in order to form an angle with respect to one another between 90 and 180 degrees.

5. The camera of claim 4 further comprising a gyroscope or accelerometer and a processor configured to receive signals from said gyroscope or accelerometer indicating a vertical direction and being further configured to crop camera images based, at least in part, on the indicated vertical direction so as to provide a horizontally oriented image, despite the rotation of the camera section.

6. The camera of claim 1, wherein said attachment portion comprises two slots for receiving two ends of a charging and/or data cable.

7. The camera of claim 1 further comprising an arrayed microphone.

8. The camera of claim 1 further comprising at least one accelerometer or gyroscope.

9. The camera of claim 1 further comprising one or more pointers configured to project laser, LED, infrared, or polarized light.

10. The camera of claim 9 wherein said one or more pointers are configured and arranged to project at least a portion of a recording window that indicates at least a portion of a recording area of the camera.

11. The camera of claim 10 wherein said one or more pointers are disposed within said camera section and behind an optic zoom.

12. The camera of claim 1 further comprising an attachment feature to removably attach the camera to a structure or surface.

13. The camera of claim 12, wherein said attachment feature comprises a clip, Velcro, magnets, an attachment strip, a lock, a bore, a projection, or a bayonet mount.

14. A camera comprising:
a camera section, comprising a housing, a camera, and a lens;
a body section, comprising a housing;
wherein said camera section and said body section are configured to contact one another along a first angled surface of the camera section and a second angled surface of the body section;
an arrayed microphone; and
a joint for connecting said camera section to said body section, wherein said joint allows said camera section to rotate at said first and second angled surfaces, and wherein said joint comprises a sound-activated servo configured to direct said camera section towards sound detected by said arrayed microphone.

15. The camera of claim 14 wherein said first and second angled surfaces comprise planar surfaces having an angle of between 35 and 55 degrees from horizontal when the camera is in a vertical position.

16. The camera of claim 15 wherein said joint allows said camera section and said body section to rotate with respect to one another in order to form an angle with respect to one another between 90 and 180 degrees.

17. The camera of claim 16 further comprising a gyroscope or accelerometer and a processor configured to receive signals from said gyroscope or accelerometer indicating a vertical direction and being further configured to crop camera images based, at least in part, on the indicated vertical direction so as to provide a horizontally oriented image, despite the rotation of the camera section.

18. The camera of claim 14 further comprising an attachment portion removably attached to said body section or said camera section.

19. The camera of claim 18 wherein said attachment portion removably attaches to said body portion through the use of magnets.

20. A camera comprising:
a camera section, comprising a housing, a camera, and a lens;
a body section, comprising a housing;
wherein said camera section and said body section are configured to contact one another along a first angled surface of the camera section and a second angled surface of the body section;
at least one accelerometer or gyroscope; and
a joint for connecting said camera section to said body section, wherein said joint allows said camera section to rotate at said first and second angled surfaces, and wherein said joint comprises a motorized servo configured to self-level said camera section in response to camera movements detected by said at least one accelerometer or gyroscope.

21. The camera of claim 20 wherein said first and second angled surfaces comprise planar surfaces having an angle of between 35 and 55 degrees from horizontal when the camera is in a vertical position.

22. The camera of claim 21 wherein said joint allows said camera section and said body section to rotate with respect to one another in order to form an angle with respect to one another between 90 and 180 degrees.

23. The camera of claim 22 further comprising a processor configured to receive signals from said gyroscope or accelerometer indicating a vertical direction and being further configured to crop camera images based, at least in part, on the indicated vertical direction so as to provide a horizontally oriented image, despite the rotation of the camera section.

24. The camera of claim 20 further comprising an attachment portion removably attached to said body section or said camera section.

25. Headphones, comprising:
- two housings, each comprising a loudspeaker located inside the housings and cushions coupled to the housings, and a headband connecting the two housings;
- a camera removably attached to one or more of said housings or said headband;
- wherein said camera further comprises:
  - a camera section, comprising a housing, a video camera, and a lens;
  - a body section, comprising a housing;
  - wherein said camera section and said body section are configured to contact one another along a first angled surface of the camera section and a second angled surface of the body section;
  - a joint for connecting said camera section to said body section, wherein said joint allows said camera section to rotate at said first and second angled surfaces; and
  - an attachment portion that removably attaches to said body portion through the use of one or more magnets, wherein said attachment portion is capable of receiving at least one end of a charging and/or data cable.

* * * * *